United States Patent
Aoki

(10) Patent No.: US 9,617,422 B2
(45) Date of Patent: Apr. 11, 2017

(54) POLYCARBONATE RESIN COMPOSITION AND MOLDED ARTICLE

(71) Applicant: IDEMITSU KOSAN CO., LTD., Chiyoda-ku (JP)

(72) Inventor: Yusuke Aoki, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 14/426,877

(22) PCT Filed: Sep. 13, 2013

(86) PCT No.: PCT/JP2013/074889
§ 371 (c)(1),
(2) Date: Mar. 9, 2015

(87) PCT Pub. No.: WO2014/042252
PCT Pub. Date: Mar. 20, 2014

(65) Prior Publication Data
US 2015/0210854 A1   Jul. 30, 2015

(30) Foreign Application Priority Data
Sep. 14, 2012 (JP) .................. 2012-203476

(51) Int. Cl.
| | |
|---|---|
| C08L 83/00 | (2006.01) |
| C08L 83/04 | (2006.01) |
| C08K 5/42 | (2006.01) |
| C08L 69/00 | (2006.01) |
| C08L 83/10 | (2006.01) |
| C08L 51/08 | (2006.01) |
| C08G 77/448 | (2006.01) |

(52) U.S. Cl.
CPC ............... *C08L 83/04* (2013.01); *C08K 5/42* (2013.01); *C08L 69/00* (2013.01); *C08L 83/10* (2013.01); *C08G 77/448* (2013.01); *C08L 51/08* (2013.01)

(58) Field of Classification Search
CPC ......... C08L 83/04; C08L 83/06; C08K 5/005; C08K 5/52
See application file for complete search history.

(56) References Cited

U.S. PATENT DOCUMENTS

| | | | |
|---|---|---|---|
| 7,018,567 B2 | 3/2006 | Murray | |
| 8,871,836 B2 * | 10/2014 | Aoki | ........................ C08K 3/22 523/200 |
| 2004/0011999 A1 | 1/2004 | Murray | |
| 2008/0033077 A1 * | 2/2008 | Hashimoto | ............. C08L 67/04 524/9 |
| 2009/0234075 A1 | 9/2009 | Hayata et al. | |
| 2012/0283393 A1 | 11/2012 | Ishikawa | |
| 2013/0082222 A1 | 4/2013 | Aoki | |
| 2014/0106208 A1 * | 4/2014 | Ishikawa | ............... H01M 2/026 429/176 |
| 2014/0343200 A1 * | 11/2014 | Takimoto | ............. C08K 5/1515 524/109 |
| 2015/0001054 A1 * | 1/2015 | Aoki | ........................ C08K 5/42 200/293 |
| 2016/0009919 A1 * | 1/2016 | Aoki | ..................... C08G 64/08 524/166 |
| 2016/0208075 A1 * | 7/2016 | Aoki | ....................... C08L 69/00 |

FOREIGN PATENT DOCUMENTS

| | | |
|---|---|---|
| EP | 1 529 810 A1 | 5/2005 |
| EP | 2 511 321 A1 | 10/2012 |
| JP | 09 316320 | 12/1997 |

(Continued)

OTHER PUBLICATIONS

International Search Report Issued Dec. 10, 2013 in PCT/JP13/074889 Filed Sep. 13, 2013.
Extended European Search Report issued on Apr. 13, 2016 in corresponding European Application No: 13836938, 5 pp.
Office Action issued Jan. 17, 2017, in Japanese Patent Application No. 2012-203476, filed Sep. 14, 2012.

*Primary Examiner* — Hannah Pak
(74) *Attorney, Agent, or Firm* — Oblon, McClelland, Maier & Neustadt, L.L.P.

(57) ABSTRACT

Provided is a polycarbonate-based resin composition, including, with respect to 100 parts by mass of (A) a resin mixture formed of 30 to 100 mass % of a polycarbonate-polyorganosiloxane copolymer (A-1) having a structural unit represented by the general formula (I) and a structural unit represented by the general formula (II), and having an average number of repetitions n of an organosiloxane constituent unit in the general formula (II) of 50 to 500, and 0 to 70 mass % of an aromatic polycarbonate (A-2) except the copolymer (A-1), 1 to 5.5 parts by mass of (B) a polyorganosiloxane-acrylic composite rubber, the composition having a viscosity-average molecular weight of 17,000 to 23,000. Also provided is a molded article thereof.

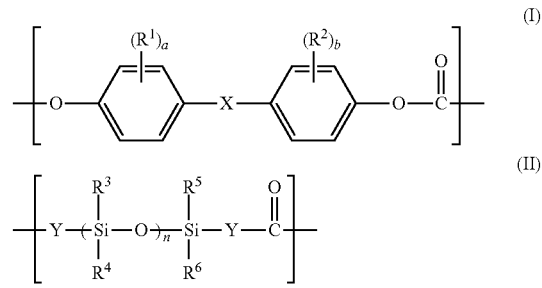

10 Claims, No Drawings

(56) References Cited

FOREIGN PATENT DOCUMENTS

| | | |
|---|---|---|
| JP | 2000 191897 | 7/2000 |
| JP | 2002 348457 | 12/2002 |
| JP | 2004 161888 | 6/2004 |
| JP | 2005 126711 | 5/2005 |
| JP | 2008 101117 | 5/2008 |
| JP | 2009 7487 | 1/2009 |
| JP | 2009 120707 | 6/2009 |
| JP | 2010 86653 | 4/2010 |
| JP | 2011 21127 | 2/2011 |
| JP | 2011 122048 | 6/2011 |
| JP | 2012 246430 | 12/2012 |
| WO | 2006 062032 | 6/2006 |

\* cited by examiner

POLYCARBONATE RESIN COMPOSITION AND MOLDED ARTICLE

TECHNICAL FIELD

The present invention relates to a polycarbonate-based resin composition, a molded article obtained by molding the resin composition, and a current breaker structural member for an automobile formed of the molded article.

BACKGROUND ART

In recent years, vigorous progress has been made in the development of a next-generation automobile from which the curtailment of carbon dioxide and a reduction in oil dependence can be expected such as an electric vehicle (EV), a hybrid vehicle (HV), or a plug-in hybrid vehicle (PHV). A large electric current frequently flows in such automobile and hence an apparatus for breaking an electric current is needed for preventing secondary damage such as a fire, electric leakage, or an electric shock due to an accident or the like. A gas pressure-type electric circuit breaker that detonates or burns explosives and breaks an electric circuit with a pressure generated by the detonation or burning has been known as such apparatus (for example, Patent Document 1).

A gas pressure-type electric circuit breaker using an inflator to be placed in an automobile needs to satisfy the requirements of the ISO12097 test and an automobile manufacturer's original test in conformity therewith. For example, ISO12097-3 requires impact tests at −35° C., 23° C., and 85° C. In addition, when it is assumed that the breaker is used in an extreme cold land as described in JIS D204 as a JIS standard for automobile parts, a low-temperature test at −30° C. or −40° C. is required. To satisfy such requirements, a metal or a ceramic has been used in the housing of the gas pressure-type electric circuit breaker for an automobile. However, achieving a reduction in weight of the automobile and an improvement in fuel efficiency thereof involves the following problem. A member formed of the metal or the ceramic needs to be replaced with a member made of a resin (resinification). At the time of the resinification, a general engineering plastic resistant to heat at 100° C. or more can satisfy the requirement of a test under an environment at 85° C. At the same time, however, it is necessary to satisfy the requirement of a test under a low-temperature environment at from −35 to −40° C. In addition to such requirements, high levels of environmental characteristics (such as long-term resistance to heat at 100° C. or more (high-temperature aging resistance)) or a high level of flame retardancy to prepare for accidental ignition may be required.

Meanwhile, a polycarbonate-polyorganosiloxane copolymer (hereinafter sometimes referred to as "PC-POS copolymer") as a polycarbonate-based material has been known as a resin material having a high level of low-temperature impact characteristic.

For example, Patent Document 2 discloses, as such PC-POS copolymer, a resin composition obtained by incorporating a polyorganosiloxane-acrylic composite rubber, a phosphorus-based flame retardant, and an anti-dripping agent into an aromatic polycarbonate resin. However, the polycarbonate resin composition comprising the phosphorus-based flame retardant has involved a problem in that both of its short-term heat resistance and long-term heat resistance are remarkably poor.

Patent Document 3 discloses a resin composition obtained by incorporating a polyorganosiloxane-acrylic composite rubber into an aromatic polycarbonate resin. Although the initial low-temperature impact characteristic of the aromatic polycarbonate resin composition improves, the composition has involved a problem in that its low-temperature impact characteristic after long-term high-temperature aging is remarkably poor.

Patent Document 4 discloses a resin composition obtained by incorporating a polyorganosiloxane-acrylic composite rubber into a resin composition formed of: a polyester containing a polycarbonate-polyorganosiloxane copolymer; and an aromatic polycarbonate. However, the polycarbonate resin composition comprising the polyester has involved a problem in that its low-temperature impact characteristic is much poorer than that of a composition that does not comprise any polyester. Although the Document describes that an average number of repetitions n of the organosiloxane constituent unit of the polycarbonate-polyorganosiloxane copolymer is preferably 40 to 60, the low-temperature impact characteristic of the polycarbonate-polyorganosiloxane copolymer is insufficient and the Document has no discussion about its low-temperature impact characteristic after long-term high-temperature aging.

Patent Document 5 discloses a resin composition obtained by incorporating a polyorganosiloxane-acrylic composite rubber into a resin composition formed of a polycarbonate containing a polycarbonate-polyorganosiloxane copolymer. Although the Document has no description about a preferred average number of repetitions of an organosiloxane constituent unit, a composition having an average number of repetitions n of 30 is described in Examples. However, the Document has no discussion about the low-temperature impact characteristic of the polycarbonate-polyorganosiloxane copolymer after long-term high-temperature aging, and the low-temperature impact characteristic remain further improvement.

As described above, the low-temperature impact characteristic of a related-art polycarbonate resin composition containing a PC-POS copolymer after long-term high-temperature aging reduces, and hence it has been unable to obtain a resin composition excellent in low-temperature impact strength after high-temperature aging.

CITATION LIST

Patent Document

[Patent Document 1]: JP 2010-86653 A
[Patent Document 2]: JP 2009-7487 A
[Patent Document 3]: JP 2008-101117 A
[Patent Document 4]: JP 2005-126711 A
[Patent Document 5]: JP 2000-191897 A

SUMMARY OF INVENTION

Technical Problem

Although a polycarbonate-based resin composition containing a PC-POS copolymer is excellent in impact resistance under a low-temperature environment, the composition involves a problem in that its performance reduces after long-term high-temperature aging.

An object of the present invention is to provide a polycarbonate-based resin composition having such a characteristic that the low-temperature impact characteristic of a PC-POS copolymer is maintained even after long-term high-temperature aging, a molded article obtained by molding the resin composition, and a current breaker structural member for an automobile formed of the molded article.

Solution to Problem

The inventors of the present invention have found that the above-mentioned object can be achieved by blending a polycarbonate-polyorganosiloxane copolymer having a specific number of repetitions of an organosiloxane constituent unit with a polyorganosiloxane-acrylic composite rubber, and have completed the present invention.

That is, the present invention is as described below.

(1) A polycarbonate-based resin composition, including, with respect to 100 parts by mass of (A) a resin mixture formed of 30 to 100 mass % of a polycarbonate-polyorganosiloxane copolymer (A-1) having a structural unit represented by the general formula (I) and a structural unit represented by the general formula (II), and having an average number of repetitions n of an organosiloxane constituent unit in the general formula (II) of 50 to 500, and 0 to 70 mass % of an aromatic polycarbonate (A-2) except the copolymer (A-1), 1 to 5.5 parts by mass of (B) a polyorganosiloxane-acrylic composite rubber, the composition having a viscosity-average molecular weight of 17,000 to 23,000:

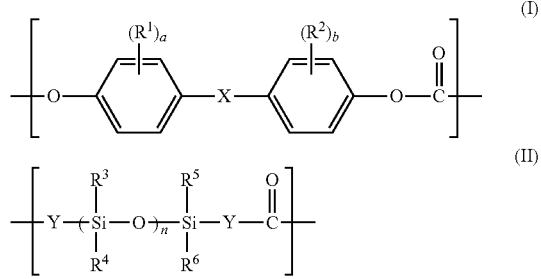

wherein, $R^1$ and $R^2$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, a and b each independently represent an integer of 0 to 4, $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents a single bond or an organic residue containing an aliphatic or aromatic moiety, and n represents an average number of repetitions.

In addition, the polycarbonate-based resin composition can be blended with (C) an alkali metal salt and/or alkali earth metal salt of an organic sulfonic acid, and/or (D) a polytetrafluoroethylene-based anti-dripping agent having a fibril-forming ability, and the incorporation of any such component can provide a polycarbonate-based resin composition additionally improved in flame retardancy. Further, the polycarbonate-based resin composition can be blended with (E) a polyorganosiloxane, and the blending can provide a polycarbonate-based resin composition that is prevented from deteriorating and whose mechanical strength, heat resistance, and the like are maintained.

(2) A molded article, which is obtained by molding the polycarbonate-based resin composition.

(3) A current breaker structural member, including the molded article.

Advantageous Effects of Invention

The polycarbonate-based resin composition of the present invention is excellent in impact resistance under low temperature and has an excellent low-temperature impact strength even after high-temperature aging because the polycarbonate-polyorganosiloxane copolymer or the resin mixture containing the polycarbonate-polyorganosiloxane copolymer and the aromatic polycarbonate except the polycarbonate-polyorganosiloxane copolymer is blended with the polyorganosiloxane-acrylic composite rubber.

DESCRIPTION OF EMBODIMENTS

According to one embodiment of the present invention, there is provided a polycarbonate-based resin composition, including, with respect to 100 parts by mass of (A) a resin mixture formed of 30 to 100 mass % of a polycarbonate-polyorganosiloxane copolymer (A-1) having a structural unit represented by the general formula (I) and a structural unit represented by the general formula (II), and having an average number of repetitions n of an organosiloxane constituent unit in the general formula (II) of 50 to 500, and 0 to 70 mass % of an aromatic polycarbonate (A-2) except the copolymer (A-1), 1 to 5.5 parts by mass of (B) a polyorganosiloxane-acrylic composite rubber, the composition having a viscosity-average molecular weight of 17,000 to 23,000. Hereinafter, each component of the polycarbonate-based resin composition of the present invention is described.

[(A-1) PC-POS Copolymer]

The PC-POS copolymer to be used in the present invention is a copolymer containing the constituent units represented by the general formulae (I) and (II). The content of the constituent unit represented by the general formula (I) is preferably 70 to 98 mass %, more preferably 85 to 97.5 mass %, still more preferably 90 to 97 mass % in the PC-POS copolymer (A-1). In addition, the content of the constituent unit represented by the general formula (II) is preferably 2 to 30 mass %, more preferably 2.5 to 15 mass %, still more preferably 3 to 10 mass %, still more preferably 3 to 6.0 mass % in the PC-POS copolymer (A-1). When the content is 2 mass % or more, an improving effect on the impact strength of the composition is sufficient. Meanwhile, when the content is 30 mass % or less, the composition has sufficient heat resistance. It should be noted that the content of each constituent unit in the PC-POS copolymer (A-1) is a value calculated by nuclear magnetic resonance (NMR) measurement.

In addition, in the present invention, the average number of repetitions n of the organosiloxane constituent unit in the general formula (II) is 50 to 500, more preferably 70 to 400, still more preferably 80 to 250, still further more preferably 85 to 190. When n is less than 50, an improving effect on the impact characteristic of the composition at low temperature is insufficient. Further, when n is 500 or less, no problem arises in the handling characteristics of the polyorganosiloxane, which is preferred from the viewpoint of the production of the PC-POS copolymer. It should be noted that the value for the average number of repetitions n is a value calculated by nuclear magnetic resonance (NMR) measurement.

The viscosity-average molecular weight (Mv) of the PC-POS copolymer as the component (A-1) is preferably 12,000 to 50,000, more preferably 14,000 to 30,000, still more preferably 16,000 to 25,000 from the viewpoint of a balance between the strength and productivity of a molded article. It should be noted that the component (A-1) is combined with the aromatic polycarbonate except the component (A-1), as the component (A-2) to be described later to be used as a resin mixture, and hence the above-mentioned viscosity-average molecular weight is preferred. However, when the component (A-1) is used alone, a component having a viscosity-average molecular weight in the range of 17,000 to 23,000 is preferably used in terms of the moldability of the composition. The viscosity-average molecular weight (Mv) is a value calculated from Schnell's equation ($[\eta]=1.23\times 10^{-5}\times Mv^{0.83}$) by measuring the limiting viscosity $[\eta]$ of a methylene chloride solution at 20° C.

The PC-POS copolymer as the component (A-1) is obtained by copolymerizing a dihydric phenol represented by the following general formula (1), a polyorganosiloxane represented by the following general formula (2), and phosgene, a carbonate, or a chloroformate.

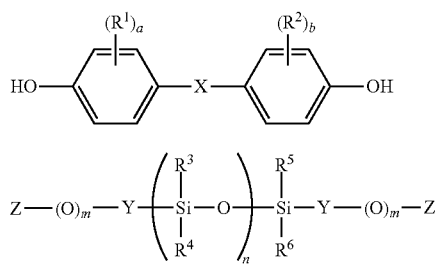

(1)

(2)

wherein, in the general formula (1), $R^1$ and $R^2$, X, and a and b are identical to those of the general formula (I), and in the general formula (2), $R^3$ to $R^6$ and Y are identical to those of the general formula (II), n represents 50 to 500, m represents 0 or 1, Z represents a halogen, —$R^7$OH, —$R^7$COOH, —$R^7$NH$_2$, —COOH, or —SH, and $R^7$ represents a linear, branched, or cyclic alkylene group, an aryl-substituted alkylene group, an aryl-substituted alkylene group that may have an alkoxy group on a ring thereof, or an arylene group.

The dihydric phenol represented by the general formula (1) to be used as a raw material for the PC-POS copolymer as the component (A-1) in the polycarbonate resin composition of the present invention is not particularly limited, but is suitably 2,2-bis(4-hydroxyphenyl)propane (trivial name: bisphenol A). When bisphenol A is used as the dihydric phenol, in the resultant PC-POS copolymer, X represents an isopropylidene group and a=b=0 in the general formula (I).

Examples of the dihydric phenol except bisphenol A include: bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl) octane, bis(4-hydroxyphenyl) phenylmethane, bis(4-hydroxyphenyl) diphenylmethane, 2,2-bis(4-hydroxy-3-methylphenyl) propane, bis(4-hydroxyphenyl)naphthylmethane, 1,1-bis(4-hydroxy-t-butylphenyl)propane, 2,2-bis(4-hydroxy-3-bromophenyl)propane, 2,2-bis(4-hydroxy-3,5-dimethylphenyl) propane, 2,2-bis(4-hydroxy-3-chlorophenyl) propane, 2,2-bis(4-hydroxy-3,5-dichlorophenyl)propane, and 2,2-bis(4-hydroxy-3,5-dibromophenyl)propane; bis(hydroxyaryl) cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl) adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

One of those dihydric phenols may be used alone, or two or more thereof may be used as a mixture.

The polyorganosiloxane represented by the general formula (2) can be easily produced by subjecting a phenol having an olefinically unsaturated carbon-carbon bond, suitably, for example, vinylphenol, allylphenol, eugenol, or isopropenylphenol, to a hydrosilylation reaction with a terminal of a polyorganosiloxane chain having a predetermined polymerization degree n. The phenol is more preferably allylphenol or eugenol. In this case, Y in the general formula (II) of the component (A-1) represents an organic residue derived from allylphenol or eugenol.

Examples of the polyorganosiloxane represented by the general formula (2) include compounds represented by the following general formulae (3) to (11).

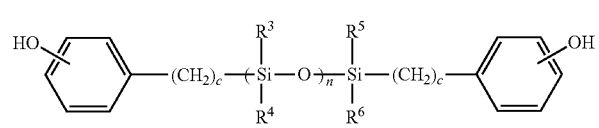

(3)

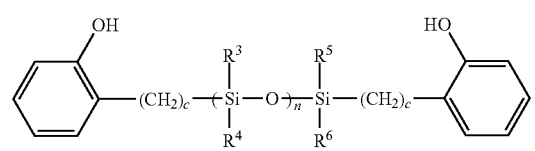

(4)

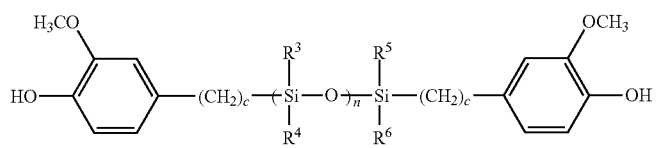

(5)

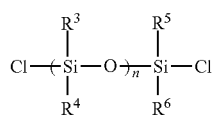

(6)

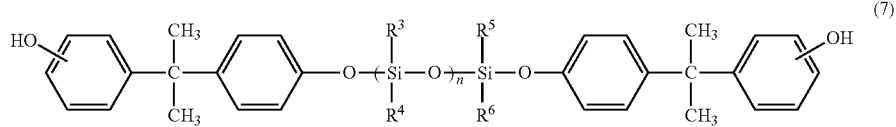

(7)

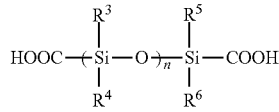

(8)

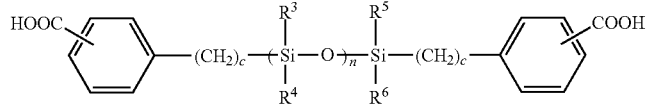

(9)

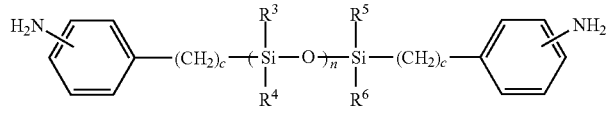

(10)

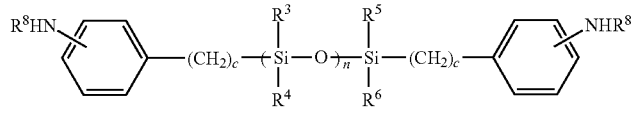

(11)

In the general formulae (3) to (11), $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms as in the general formula (II), n represents an average number of repetitions of an organosiloxane constituent unit and represents a number of 50 to 500. In addition, $R^8$ represents an alkyl, alkenyl, aryl, or aralkyl group, and c represents a positive integer and typically represents an integer of 1 to 6.

Of those, a phenol-modified polyorganosiloxane represented by the general formula (3) is preferred from the viewpoint of its ease of polymerization. In addition, an α,ω-bis[3-(o-hydroxyphenyl)propyl]polydimethylsiloxane as one of compounds represented by the general formula (4) or an α,ω-bis[3-(4-hydroxy-2-methoxyphenyl)propyl]polydimethylsiloxane as one of compounds represented by the general formula (5) is preferred from the viewpoint of its ease of availability.

The phenol-modified polyorganosiloxane can be produced by a known method. For example, the following is available as the production method.

First, cyclotrisiloxane and disiloxane are caused to react with each other in the presence of an acid catalyst to synthesize an α,ω-dihydrogen organopolysiloxane. At this time, an α,ω-dihydrogen organopolysiloxane having a desired average repeating unit can be synthesized by changing a blending ratio between cyclotrisiloxane and disiloxane. Next, the α,ω-dihydrogen organopolysiloxane is subjected to an addition reaction with a phenol compound having an unsaturated aliphatic hydrocarbon group such as allylphenol or eugenol in the presence of a catalyst for a hydrosilylation reaction, whereby a phenol-modified polyorganosiloxane having a desired average repeating unit can be produced.

In addition, at this stage, a cyclic polyorganosiloxane having a low molecular weight and an excessive amount of the phenol compound remain as impurities. Accordingly, those low-molecular weight compounds are preferably removed by distillation with heating under reduced pressure.

[(A-2) Aromatic Polycarbonate Resin Except (A-1)]

As the component (A-2), which is the aromatic polycarbonate except the (A-1), in the polycarbonate resin composition of the present invention, there can be used a polycarbonate obtained by a conventional production method for an aromatic polycarbonate such as: an interfacial polymerization method involving causing a dihydric phenol compound and phosgene to react with each other in the presence of an organic solvent inert to the reaction and an alkali aqueous solution, and then adding a polymerization catalyst such as a tertiary amine or a quaternary ammonium salt to perform polymerization; or a pyridine method involving dissolving the dihydric phenol compound in pyridine or a mixed solution of pyridine and the inert solvent, and introducing phosgene to produce the polycarbonate directly.

Examples of the dihydric phenol compound to be used in the production of the aromatic polycarbonate as the component (A-2) include: bis(hydroxyaryl)alkanes such as 2,2-bis(4-hydroxyphenyl)propane (trivial name: bisphenol A), bis(4-hydroxyphenyl)methane, 1,1-bis(4-hydroxyphenyl) ethane, 2,2-bis(4-hydroxyphenyl)butane, 2,2-bis(4-hydroxyphenyl)octane, bis(4-hydroxyphenyl)phenylmethane, bis(4-hydroxyphenyl) diphenylmethane, 2,2-bis(4-hydroxy-3-methylphenyl)propane, bis(4-hydroxyphenyl) naphthylmethane, 1,1-bis(4-hydroxy-3-t-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl) propane, and 2,2-bis(4-hydroxy-3,5-dibromophenyl)propane; bis(hydroxyaryl) cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane; dihydroxyaryl ethers such as 4,4'-dihydroxydiphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as 1,3-bis(4-hydroxyphenyl)adamantane, 2,2-bis(4-hydroxyphenyl)adamantane, and 1,3-bis(4-hydroxyphenyl)-5,7-dimethyladamantane; 4,4'-[1,3-phenylenebis(1-methylethylidene)]bisphenol; 10,10-bis(4-hydroxyphenyl)-9-anthrone; and 1,5-bis(4-hydroxyphenylthio)-2,3-dioxapentane.

Each of those dihydric phenols may be used alone, or two or more thereof may be used as a mixture.

A molecular weight modifier, a chain-end terminator, or the like may be used as required at the time of the production of the aromatic polycarbonate as the component (A-2). Various kinds thereof typically used in the polymerization of polycarbonate resins can each be used.

Specific examples of the molecular weight modifier include monohydric phenols such as phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-nonylphenol, m-nonylphenol, p-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, p-bromophenol, 2,4,6-tribromophenol, a monoalkylphenol having a linear or branched alkyl group having an average number of carbon atoms of from 12 to 35 at the ortho-, meta- or para-position, 9-(4-hydroxyphenyl)-9-(4-methoxyphenyl) fluorene, 9-(4-hydroxy-3-methylphenyl)-9-(4-methoxy-3-methylphenyl) fluorene, and 4-(1-adamantyl)phenol.

Among those monohydric phenols, p-t-butylphenol, p-cumylphenol, p-phenylphenol, or the like is preferred. In addition, one of those compounds may be used alone, or two or more thereof may be used in combination.

A monovalent carboxylic acid and a derivative thereof and a monohydric phenol may each be used as the chain-end terminator. Examples thereof include p-tert-butyl-phenol, p-phenylphenol, p-cumylphenol, p-perfluorononylphenol, p-perfluorooctylphenol, p-perfluorohexylphenol, p-(perfluorononylphenyl)phenol, p-(perfluorohexylphenyl) phenol, p-tert-perfluorobutylphenol, 1-(p-hydroxybenzyl) perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, and 1,1,1,3,3,3-hexafluoro-2-propanol.

Further, along with dihydric phenol compound, a branching agent can be used to obtain a branched polycarbonate. The addition amount of the branching agent is preferably 0.01 to 3 mol %, more preferably 0.1 to 1.0 mol % with respect to the dihydric phenol compound.

Examples of the branching agent include compounds each having three or more functional groups such as 1,1,1-tris(4-hydroxyphenyl)ethane, 4,4'-[1-[4-[1-(4-hydroxyphenyl)-1-methylethyl]phenyl]ethylidene]bisphenol, α,α',α"-tris(4-hydroxyphenyl)-1,3,5-triisopropylbenzene, 1-[α-methyl-α-(4'-hydroxyphenyl) ethyl]-4-[α',α'-bis(4"-hydroxyphenyl) ethyl]benzene, phloroglucin, trimellitic acid, and isatinbis (o-cresol).

The content of the component (A-1) in the resin mixture (A) formed of the component (A-1) and the component (A-2) is 30 to 100 mass %, preferably 45 to 100 mass %, more preferably 60 to 100 mass %. The content of the component (A-2) is 70 to 0 mass %, preferably 55 to 0 mass %, more preferably 40 to 0 mass %.

When the content of the component (A-1) is less than 30 mass % or the content of the component (A-2) exceeds 70 mass %, the content of a polyorganosiloxane block moiety as the constituent unit represented by the general formula (II) needs to be increased at the time of the production of the component (A-1) for increasing the content of the polyorganosiloxane block moiety in the resin mixture (A) to improve the low-temperature impact strength of the composition. However, increasing the content at the time of the production of the component (A-1) may reduce the uniformity of the reaction in the polymerizing step, and may deteriorate the separability of a polymer and washing water in the step of washing the polymer, and hence the productivity of the component (A-1) largely reduces.

[(B) Polyorganosiloxane-Acrylic Composite Rubber]

The polyorganosiloxane-acrylic composite rubber to be used in the polycarbonate-based resin composition of the present invention has a core structure formed of a rubber component in which a polyorganosiloxane and an acrylic component such as a polyalkyl (meth)acrylate are entangled with each other so as not to be capable of being separated from each other. Although the polyorganosiloxane to be used in the polyorganosiloxane-acrylic composite rubber is not particularly limited, a polyorganosiloxane containing a vinyl polymerizable functional group is preferred. Such polyorganosiloxane can be produced by, for example, polymerizing a mixture formed of a diorganosiloxane and a vinyl polymerizable functional group-containing siloxane, or a latex further containing a siloxane-based crosslinking agent as required in addition to the mixture with an acid catalyst under high temperature.

An example of the diorganosiloxane to be used in the production of the polyorganosiloxane is a three- or higher membered diorganosiloxane-based cyclic substance, preferably a three- to seven-membered diorganosiloxane-based cyclic substance. Specific examples thereof include hexamethylcyclotrisiloxane, octamethylcyclotetrasiloxane, decamethylcyclopentasiloxane, and dodecamethylcyclohexasiloxane. One of those diorganosiloxanes may be used alone, or two or more thereof may be used in combination.

In addition, the vinyl polymerizable functional group-containing siloxane may be a siloxane that contains a vinyl polymerizable functional group and can be bonded to the diorganosiloxane through a siloxane bond, and any one of the various alkoxysilane compounds each containing a vinyl polymerizable functional group is preferred in consideration of reactivity with the diorganosiloxane. Specific examples thereof include: methacryloyloxysilanes such as β-methacryloyloxyethyldimethoxymethylsilane, γ-methacryloyloxypropyldimethoxymethylsilane, γ-methacryloyloxypropylmethoxydimethylsilane, γ-methacryloyloxypropyltrimethoxysilane, γ-methacryloyloxypropylethoxydiethylsilane, γ-methacryloyloxypropylethoxydiethoxymethylsilane and δ-methacryloyloxybutyldiethoxymethylsilane; vinylsiloxanes such as tetramethyltetravinylcyclotetrasiloxane; vinylphenylsilanes such as p-vinylphenyldimethoxymethylsilane; and mercaptosiloxanes such as γ-mercaptopropyldimethoxymethylsilane and γ-mercaptopropyltrimethoxysilane. One of those vinyl polymerizable functional group-containing siloxanes may be used alone, or two or more thereof may be used as a mixture.

A trifunctional or tetrafunctional silane-based crosslinking agent such as trimethoxymethylsilane, triethoxyphenylsilane, tetramethoxysilane, tetraethoxysilane, or tetrabutoxysilane may be used as the siloxane-based crosslinking agent. Specifically, the production of the polyorganosiloxane can be performed, for example, by: emulsifying a mixture formed of the diorganosiloxane and the vinyl polymerizable functional group-containing siloxane, or a mixture further containing the siloxane-based crosslinking agent as required in addition to the components with an emulsifying agent and water to provide a latex; turning the latex into fine particles with, for example, a homomixer that turns the latex into fine particles with a shear force generated by its high-speed rotation or a homogenizer that turns the latex into fine particles with ejection power generated by a high-pressure generator; polymerizing the fine particles with the acid catalyst under high temperature; and neutralizing an acid with an alkaline substance.

Available as a method of adding the acid catalyst to be used in the polymerization is, for example, a method involving mixing the catalyst together with the siloxane mixture, the emulsifying agent, and water, or a method involving dropping the latex in which the siloxane mixture has been turned into fine particles into a high-temperature aqueous solution of the acid catalyst at a constant rate. Among them, a method involving dropping the latex in which the siloxane mixture has been turned into fine particles into a high-temperature aqueous solution of the acid catalyst at a constant rate is suitably employed in consideration of the ease with which the particle diameter of the polyorganosiloxane is controlled.

In addition, an anionic emulsifying agent is preferred as the emulsifying agent to be used in the production of the polyorganosiloxane. An emulsifying agent selected from the following is used: sodium alkylbenzenesulfonate, sodium polyoxyethylene nonylphenyl ether sulfate, and the like. In particular, sodium alkylbenzenesulfonate, sodium lauryl sulfate, or the like is preferred.

Available as a method of mixing the siloxane mixture, the emulsifying agent, water, and/or the acid catalyst is, for example, mixing by high-speed stirring or mixing with a high-pressure emulsifying apparatus such as a homogenizer. Among them, a method involving using a homogenizer is a preferred method because the particle diameter distribution of the polyorganosiloxane latex becomes small. Examples of the acid catalyst to be used in the polymerization of the polyorganosiloxane include: sulfonic acids such as an aliphatic sulfonic acid, an aliphatic-substituted benzenesulfonic acid, and an aliphatic-substituted naphthalene sulfonic acid; and mineral acids such as phosphoric acid, hydrochloric acid, and nitric acid. One of those acid catalysts may be used alone, or two or more thereof may be used in combination. In addition, among them, an aliphatic-substituted benzenesulfonic acid is preferred because of its excellent stabilizing action on the polyorganosiloxane latex, and n-dodecylbenzenesulfonic acid is particularly preferred. In addition, the combined use of n-dodecylbenzenesulfonic acid and a mineral acid such as sulfuric acid can reduce the external appearance failure of a thermoplastic resin composition resulting from the emulsifying agent component of the polyorganosiloxane latex.

A polymerization temperature for obtaining the polyorganosiloxane is preferably 50° C. or more, more preferably 80° C. or more. In addition, a polymerization time for obtaining the polyorganosiloxane is preferably 2 hours or more, more preferably 5 hours or more when the acid catalyst is mixed together with the siloxane mixture, the emulsifying agent, and water, the mixture is turned into fine particles, and the fine particles are polymerized. In the method involving dropping the latex in which the siloxane mixture has been turned into fine particles into the aqueous solution of the acid catalyst, after the completion of the dropping of the latex, the resultant is preferably held for about 1 hour.

The polymerization can be terminated by cooling a reaction liquid and neutralizing the latex with an alkaline substance such as sodium hydroxide, potassium hydroxide, or sodium carbonate.

The rubber component for forming the core of the polyorganosiloxane-acrylic composite rubber to be used in the present invention can be produced by impregnating the polyorganosiloxane latex with a (meth)acrylate component formed of an alkyl (meth)acrylate and a polyfunctional (meth)acrylate, and subjecting the resultant to polymerization.

Examples of the alkyl (meth)acrylate include: alkyl acrylates such as methyl acrylate, ethyl acrylate, n-propyl acrylate, n-butyl acrylate, and 2-ethylhexyl acrylate; and alkyl methacrylates such as hexyl methacrylate, 2-ethylhexyl methacrylate, and n-lauryl methacrylate. One of those (meth)acrylates may be used alone, or two or more thereof may be used in combination. In addition, n-butyl acrylate is particularly preferably used in consideration of the impact resistance of a resin composition containing a graft copolymer and the gloss of a molded article thereof.

Examples of the polyfunctional (meth)acrylate include allyl methacrylate, ethylene glycol dimethacrylate, propylene glycol dimethacrylate, 1,3-butylene glycol dimethacrylate, and 1,4-butylene glycol dimethacrylate. One of those (meth)acrylates may be used alone, or two or more thereof may be used in combination. The polyfunctional (meth)acrylate is preferably, for example, a combination of allyl methacrylate and 1,3-butyleneglycol dimethacrylate in consideration of the graft structure of the graft copolymer (the amount of acetone-insoluble matter and the solution viscosity of an acetone-soluble component).

The rubber component (core) of the polyorganosiloxane-acrylic composite rubber formed of the polyorganosiloxane and the polyalkyl (meth)acrylate to be used in the present invention can be prepared by adding an acrylic component such as an alkyl (meth)acrylate to the latex of the polyorganosiloxane component and causing a normal radical polymerization initiator to act on the mixture to polymerize the mixture. Available as a method of adding the acrylic compound such as the alkyl (meth)acrylate is a method involving collectively mixing the compound with the latex of the polyorganosiloxane component or a method involving dropping the compound into the latex of the polyorganosiloxane component at a constant rate. It should be noted that a method involving collectively mixing the compound with the latex of the polyorganosiloxane component among those methods is preferred in consideration of the impact resistance of the resin composition containing the polyorganosiloxane-acrylic composite rubber to be obtained. In addition, a peroxide, an azo-based initiator, or a redox initiator obtained by combining an oxidizing agent and a reducing agent is used as the radical polymerization initiator to be used in the polymerization. Among them, a redox initiator is preferred, and a system obtained by combining ferrous sulfate, disodium ethylenediamine tetraacetate, Rongalite, and a hydroperoxide is particularly preferred.

Next, one or more vinyl monomers are subjected to graft polymerization in the presence of the rubber component (core) obtained as described above to form a shell. Thus, the polyorganosiloxane-acrylic composite rubber (B) is obtained. The vinyl monomer is not particularly limited. Examples thereof include: aromatic alkenyl compounds such as styrene, α-methylstyrene, and vinyltoluene; methacrylic acid esters such as methyl methacrylate, ethyl methacrylate, and 2-ethylhexyl methacrylate; acrylic acid esters such as methyl acrylate, ethyl acrylate, and butyl acrylate; and vinyl cyanide compounds such as acrylonitrile and methacrylonitrile. One of those monomers may be used alone, or two or more thereof may be used in combination. In addition, methyl methacrylate and acrylonitrile are preferably used in consideration of the impact resistance of a resin composition containing the polyorganosiloxane-acrylic composite rubber and the external appearance of a molded article thereof.

The graft polymerization can be performed by a radical polymerization method in one stage or a plurality of stages after the addition of the vinyl monomer to the latex of the rubber component. A peroxide, an azo-based initiator, or a redox initiator obtained by combining an oxidizing agent and a reducing agent is used as the radical polymerization initiator to be used in the polymerization. Among them, a redox initiator is preferred, and a system obtained by combining ferrous sulfate, disodium ethylenediamine tetraacetate, Rongalite, and a hydroperoxide is particularly preferred.

Various chain transfer agents for adjusting the molecular weight and graft ratio of a graft polymer can be added to the vinyl monomer to be used in the graft polymerization. In addition, at the time of the graft polymerization, an emulsifying agent can be added for stabilizing the polymerization latex and controlling the average particle diameter of a graft copolymer. Although the emulsifying agent to be used is not particularly limited, preferred examples thereof include a cationic emulsifying agent, an anionic emulsifying agent, and a nonionic emulsifying agent, and a more preferred example thereof is a combination of a sulfonate emulsifying agent or a sulfate emulsifying agent and a carboxylate emulsifying agent.

In addition, the particle diameter of the polyorganosiloxane-acrylic composite rubber prepared as described above is not particularly limited, but the average particle diameter of the polyorganosiloxane-acrylic composite rubber preferably falls within the range of 0.01 to 2 μm in consideration of the impact resistance of the polycarbonate-based resin composition containing the polyorganosiloxane-acrylic composite rubber to be obtained and the surface external appearance of a molded product thereof. When the average particle diameter is 0.01 μm or more and 2 μm or less, the impact resistance of a molded product obtained from the thermoplastic polycarbonate-based resin composition is good and the surface external appearance of the molded product is also good.

In the present invention, the polyorganosiloxane-acrylic composite rubber is produced by: loading the graft copolymer latex produced as described above into hot water having dissolved therein a metal salt such as calcium chloride, calcium acetate, or aluminum sulfate to perform salting-out; solidifying the resultant to separate the graft copolymer; and recovering the copolymer in a powder state.

Commercially available products such as METABLEN SX-005, METABLEN SRK-200, METABLEN S-2030, and METABLEN S-2006, which are manufactured by Mitsubishi Rayon Co., Ltd., may also be utilized as such polyorganosiloxane-acrylic composite rubber.

The content of the polyorganosiloxane-acrylic composite rubber (B) is from 1.0 to 5.5 parts by mass, preferably from 1.5 to 5.0 parts by mass, more preferably from 2.0 to 5.0 parts by mass, still more preferably from 2.0 to 4.5 parts by mass with respect to 100 parts by mass of the resin mixture (A). When the content is less than 1.0 part by mass, the effect of the low-temperature impact characteristic of the polycarbonate-based resin composition after long-term high-temperature aging is insufficient. When the content exceeds 5.5 parts by mass, rigidity intrinsic to the polycarbonate tends to reduce, i.e., a balance between its physical properties tends to deteriorate.

[(C) Alkali Metal Salt and Alkali Earth Metal Salt of Organic Sulfonic Acid]

In the present invention, an alkali metal salt and/or alkali earth metal salt of an organic sulfonic acid (hereinafter sometimes referred to as "organic sulfonic acid alkali (earth) metal salt") can be blended as a component (C) for improving the flame retardancy of the composition.

Examples of the organic sulfonic acid include a perfluoroalkane sulfonic acid and a polystyrene sulfonic acid.

The organic sulfonic acid alkali (earth) metal salt, which comes in various kinds, is an organic sulfonic acid alkali metal salt or alkali earth metal salt having at least one carbon atom.

Examples of the alkali metal include sodium, potassium, rubidium, lithium, and cesium, and examples of the alkali earth metal include beryllium, magnesium, calcium, strontium, and barium. Among them, sodium, potassium, and cesium salts are preferred.

As the component (C), an alkali metal salt and/or alkali earth metal salt of a perfluoroalkanesulfonic acid or a polystyrenesulfonic acid are/is preferred.

As the alkali (earth) metal salt of a perfluoroalkanesulfonic acid, there is given a salt represented by the following general formula (12).

$$(C_dF_{2d+1}SO_3)_eM \qquad (12)$$

In the formula (12), d represents an integer of 1 to 10, M represents an alkali metal such as lithium, sodium, potassium, or rubidium, cesium, or an alkali earth metal such as beryllium, magnesium, calcium, strontium, or barium, and e represents the valence of M.

For example, salts described in JP 47-40445 B correspond to these metal salts.

Examples of the perfluoroalkanesulfonic acid in the general formula (12) may include perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid, and perfluorooctanesulfonic acid. In particular, a potassium salt of any such perfluoroalkanesulfonic acid is preferably used.

In addition, in the polycarbonate-based resin composition of the present invention, an organic sulfonic acid alkali (earth) metal salt other than the perfluoroalkanesulfonic acid alkali (earth) metal salt may also be used. Examples of the organic sulfonic acid alkali (earth) metal salt may include alkali (earth) metal salts of organic sulfonic acids such as an alkylsulfonic acid, benzenesulfonic acid, an alkylbenzenesulfonic acid, diphenylsulfonic acid, naphthalenesulfonic acid, 2,5-dichlorobenzenesulfonic acid, 2,4,5-trichlorobenzenesulfonic acid, diphenyl sulfone-3-sulfonic acid, diphenyl sulfone-3,3'-disulfonic acid, and naphthalenetrisulfonic acid, and fluorine-substituted products thereof. Among them, an alkali (earth) metal salt of diphenylsulfonic acid is one of the preferred alkali (earth) metal salts as well as the alkali (earth) metal salt of the perfluoroalkanesulfonic acid.

Further, the alkali (earth) metal salt of the polystyrene sulfonic acid is, for example, an alkali (earth) metal salt of a sulfonate group-containing aromatic vinyl resin represented by the following general formula (13).

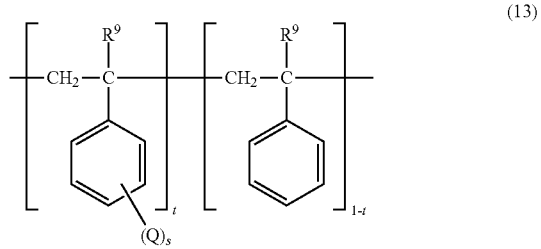

In the formula (13), Q represents a sulfonate group, $R^9$ represents a hydrogen atom or a hydrocarbon group having 1 to 10 carbon atoms, s represents an integer of 1 to 5, and t represents a molar fraction and falls within the range of $0 < t \leq 1$.

In this case, the sulfonate group Q is an alkali metal salt and/or alkali earth metal salt of a sulfonic acid, and examples of the metals include sodium, potassium, lithium, rubidium, cesium, beryllium, magnesium, calcium, strontium, and barium.

In addition, $R^9$ represents a hydrogen atom or a hydrocarbon group having 1 to 10 carbon atoms, preferably a hydrogen atom or a methyl group.

s represents an integer of from 1 to 5 and t satisfies a relationship of $0 < t \leq 1$. Therefore, the alkali (earth) metal salt of the polystyrene sulfonic acid may contain an aromatic ring that is totally substituted or partially substituted with the sulfonate group Q.

The content of the alkali (earth) metal salt of the organic sulfonic acid is 0.01 to 0.10 parts by mass, preferably, 0.02 to 0.09 parts by mass, more preferably 0.03 to 0.08 parts by mass, with respect to 100 parts by mass of the resin mixture (A).

The content within such range is preferred because the flame retardancy can be sufficiently improved.

[(D) Polytetrafluoroethylene-Based Anti-Dripping Agent Having Fibril-Forming Ability]

In the present invention, the polytetrafluoroethylene-based anti-dripping agent having a fibril-forming ability can be blended as the component (D) for imparting a melt dripping-preventing effect to the polycarbonate-based resin composition to improve its flame retardancy.

Polytetrafluoroethylene having a fibril-forming ability can be used as the anti-dripping agent, and the term "fibril-forming ability" as used herein refers to a state where the molecules of a resin show the following tendency: the molecules are bonded to each other by an external action such as a shear force so as to be fibrous.

The polytetrafluoroethylene (hereinafter sometimes referred to as PTFE) having a fibril-forming ability has an extremely high molecular weight, and has a number-average molecular weight of generally 500,000 or more, preferably 500,000 to 15,000,000, more preferably 1,000,000 to 10,000,000, which is determined from a standard specific gravity. Such PTFE may be obtained, for example, by subjecting tetrafluoroethylene to polymerization in an aqueous solvent in the presence of sodium, potassium, or ammonium peroxydisulfate under a pressure of 6.9 to 690 kPa (1 to 100 psi) at a temperature of 0 to 200° C., preferably 20 to 100° C.

In the polymerization, a fluorine-containing olefin such as hexafluoropropylene, chlorotrifluoroethylene, a fluoroalkylethylene, or a perfluoroalkyl vinyl ether, or a fluorine-containing alkyl (meth)acrylate such as a perfluoroalkyl (meth)acrylate may be used as a copolymerizable component in such a range that the characteristics of the polytetrafluoroethylene are not impaired. The content of such copolymerizable component is preferably 10 mass % or less with respect to tetrafluoroethylene in the polytetrafluoroethylene.

The polytetrafluoroethylene is preferably a PTFE particle from the viewpoint of homogeneous dispersion into the polycarbonate. The particle diameter of the PTFE particle is generally 10 μm or less, preferably 0.05 to 1.0 μm.

As commercially available products of the PTFE having a fibril-forming ability, there are given, for example, Teflon (trademark) 6-J (trade name, manufactured by DU PONT-MITSUI FLUOROCHEMICALS COMPANY, LTD.), POLYFLON D-1 and POLYFLON F-103 (trade names, manufactured by DAIKIN INDUSTRIES, ltd.), CD-076 and CD-097 (trade names, manufactured by ASAHI GLASS CO., LTD.), Algoflon F5 (trade name, manufactured by Montefluos), and POLYFLON MPA and POLYFLON FA-100 (trade names, manufactured by DAIKIN INDUSTRIES, ltd.).

One of those PTFEs may be used alone, or two or more thereof may be used in combination.

The content of the anti-dripping agent is 0.1 to 1.0 parts by mass, preferably 0.2 to 0.9 parts by mass, more preferably 0.3 to 0.8 parts by mass, with respect to 100 parts by mass of the resin mixture (A). When the content is less than 0.1 part by mass, the flame retardancy cannot be sufficiently improved. When the content exceeds 1.0 part by mass, the low-temperature impact characteristic may be reduced.

[Mixed Powder Formed of Polytetrafluoroethylene Particles and Organic Polymer Particles]

Such polytetrafluoroethylene-based anti-dripping agent to be used as the component (D) is preferably mixed powder formed of polytetrafluoroethylene particles and organic polymer particles, from the viewpoints of the external appearance and physical properties of the molded article. The mixed powder is described below.

The polytetrafluoroethylene particles in the mixed powder formed of the polytetrafluoroethylene particles and the organic polymer particles each have a particle diameter of typically 10 µm or less, preferably 0.05 to 1.0 µm.

The polytetrafluoroethylene particles are prepared as such an aqueous dispersion that the particles are dispersed in water containing, for example, an emulsifying agent. The aqueous dispersion of the polytetrafluoroethylene particles is obtained by subjecting a tetrafluoroethylene monomer to emulsion polymerization with a fluorine-containing surfactant.

Fluorine-containing olefins such as hexafluoropropylene, chlorotrifluoroethylene, a fluoroalkylethylene, and a perfluoroalkyl vinyl ether, and fluorine-containing alkyl (meth) acrylates such as a perfluoroalkyl (meth)acrylate can each be used as a copolymerizable component upon emulsion polymerization of the polytetrafluoroethylene particles as long as the characteristics of the polytetrafluoroethylene are not impaired.

The content of the copolymerizable component is preferably 10 mass % or less with respect to tetrafluoroethylene in the polytetrafluoroethylene particles.

Further, the organic polymer particles to be used as a mixture with the polytetrafluoroethylene particles, which are not particularly limited, each preferably have an affinity for a polycarbonate resin from the viewpoint of the dispersibility of the polytetrafluoroethylene particles upon blending into the resin mixture (A).

A monomer for producing the organic polymer particles may be specifically exemplified by: styrene monomers such as styrene, p-methylstyrene, o-methylstyrene, p-chlorostyrene, o-chlorostyrene, p-methoxystyrene, o-methoxystyrene, 2,4-dimethylstyrene, and α-methylstyrene; alkyl (meth)acrylate monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, tridecyl acrylate, tridecyl methacrylate, octadecyl acrylate, octadecyl methacrylate, cyclohexyl acrylate, and cyclohexyl methacrylate; vinyl cyanide monomers such as acrylonitrile and methacrylonitrile; vinyl ether monomers such as vinyl methyl ether and vinyl ethyl ether; vinyl carboxylate monomers such as vinyl acetate and vinyl butyrate; olefin monomers such as ethylene, propylene, and isobutylene; and diene monomers such as butadiene, isoprene, and dimethylbutadiene. In particular, an alkyl (meth)acrylate monomer is preferably used.

The organic polymer particles are obtained by polymerizing any such monomer. One of the monomers may be used, or two or more thereof may be used as a mixture. The organic polymer particles are preferably particles formed of an alkyl (meth)acrylate copolymer.

The organic polymer particles are prepared as, for example, an aqueous dispersion of the organic polymer particles. Although a method of producing the aqueous dispersion of the organic polymer particles is not particularly limited, an emulsion polymerization method involving using an ionic emulsifying agent and a soap-free emulsion polymerization method involving using an ionic polymerization initiator can be given as examples thereof.

Any one of an anionic emulsifying agent, a cationic emulsifying agent, and an amphoteric ionic emulsifying agent can be used as the ionic emulsifying agent. In addition, a nonionic emulsifying agent can be used in combination with any such ionic emulsifying agent.

Fatty acid salts, higher alcohol sulfates, liquid fatty oil sulfates, sulfates of aliphatic amines and aliphatic amides, aliphatic alcohol phosphates, sulfonates of dibasic fatty acid esters, fatty acid amide sulfonates, alkyl allyl sulfonates, and naphthalene sulfonates of formalin condensates can be given as examples of the anionic emulsifying agent.

Aliphatic amine salts, quaternary ammonium salts, and alkyl pyridinium salts can be given as examples of the cationic emulsifying agent.

An alkyl betaine can be given as an example of the amphoteric emulsifying agent.

Examples of the ionic polymerization initiator may include: anionic polymerization initiators such as persulfates (e.g., potassium persulfate and ammonium persulfate), azobisisobutyronitrile sulfonate, and 4,4'-azobis(4-cyanovaleric acid); and cationic polymerization initiators such as 2,2'-azobis(amidinopropane) dihydrochloride, 2,2'-azobis[2-(5-methyl-2-imidazolin-2-yl)propane]dihydrochloride, 2,2'-azobis[2-(2-imidazolin-2-yl)propane]dihydrochloride, and 2,2'-azobisisobutyramide dihydrate.

A particle diameter d of each of the organic polymer particles in the present invention, which is not particularly limited, preferably falls within a range represented by the following formula with respect to a particle diameter D of each of the polytetrafluoroethylene particles from the viewpoint of the stability of an agglomerated state with the polytetrafluoroethylene particles.

$$0.1D < d < 10D$$

The mixed powder formed of the polytetrafluoroethylene particles and the organic polymer particles is obtained by, for example, mixing the aqueous dispersion of the polytetrafluoroethylene particles and the aqueous dispersion of the organic polymer particles, and then turning the mixture into powder by a method to be described later. The mixed powder contains agglomerated particles as a result of the agglomeration of the polytetrafluoroethylene particles and the organic polymer particles caused by their difference in surface charge, and the respective individual particles remaining without undergoing the agglomeration.

Although the agglomerated particles each have such a structure that a polytetrafluoroethylene particle and an organic polymer particle are integrated with each other, various morphologies are available for the agglomerated particles depending on a mixing ratio between both the particles and their particle diameters. That is, for example, such a morphology that a polytetrafluoroethylene particle is surrounded with organic polymer particles, such a morphology that an organic polymer particle is surrounded with polytetrafluoroethylene particles in contrast to the foregoing, and such a morphology that several particles agglomerate with one particle exist.

In order that an agglomeration rate upon mixing of the aqueous dispersions may be reduced, a nonionic emulsifying agent can be caused to adsorb onto the surface of each of the polytetrafluoroethylene particles and/or the organic polymer particles before the mixing.

The nonionic emulsifying agent is not particularly limited, and a polyoxyethylene alkyl ether, a polyoxyethylene alkyl allyl ether, a dialkylphenoxypoly(ethyleneoxy)ethanol, polyvinyl alcohol, polyacrylic acid, and an alkyl cellulose can be given as examples thereof.

Then, the aqueous dispersions mixed as described above can be turned into powder by charging the mixture into hot water in which a metal salt such as calcium chloride or magnesium sulfate has been dissolved, and subjecting the resultant to salting out and coagulation, followed by drying or spray drying.

Alternatively, powder can be formed by subjecting a monomer having an ethylenically unsaturated bond in the aqueous dispersion of the polytetrafluoroethylene particles to emulsion polymerization, followed by coagulation or spray drying.

The ethylenically unsaturated monomer to be subjected to emulsion polymerization in the aqueous dispersion may be exemplified by: styrene monomers such as styrene, p-methylstyrene, o-methylstyrene, p-chlorostyrene, o-chlorostyrene, p-methoxystyrene, o-methoxystyrene, 2,4-dimethylstyrene, and α-methylstyrene; alkyl (meth)acrylate monomers such as methyl acrylate, methyl methacrylate, ethyl acrylate, ethyl methacrylate, butyl acrylate, butyl methacrylate, 2-ethylhexyl acrylate, 2-ethylhexyl methacrylate, dodecyl acrylate, dodecyl methacrylate, cyclohexyl acrylate, and cyclohexyl methacrylate; vinyl cyanide monomers such as acrylonitrile and methacrylonitrile; vinyl ether monomers such as vinyl methyl ether and vinyl ethyl ether; vinyl carboxylate monomers such as vinyl acetate and vinyl butyrate; olefin monomers such as ethylene, propylene, and isobutylene; and diene monomers such as butadiene, isoprene, and dimethylbutadiene. One of those monomers may be used alone, or two or more thereof may be used as a mixture.

For example, A-3750 and A-3800 (trade names, manufactured by Mitsubishi Rayon Co., Ltd.) and SN3300B7 (trade name, manufactured by Shine polymer) are given as a commercially available product of the mixed powder formed of the polytetrafluoroethylene particles and the organic polymer particles.

[(E) Polyorganosiloxane]

In the present invention, a polyorganosiloxane is preferably further incorporated as a component (E) for preventing the deterioration of the resin composition to maintain its characteristics such as a mechanical strength, stability, and heat resistance.

Examples of such polyorganosiloxane include, but not particularly limited to, an alkyl hydrogen silicone and an alkoxysilicone.

Examples of the alkyl hydrogen silicone include methyl hydrogen silicone and ethyl hydrogen silicone. On the other hand, examples of the alkoxysilicone include methoxysilicone and ethoxysilicone.

Among them, an alkoxysilicone is particularly preferred. Specifically, the alkoxysilicone is a silicone compound containing an alkoxysilyl group obtained by bonding an alkoxy group to a silicon atom directly or through a divalent hydrocarbon group, and examples thereof include a linear polyorganosiloxane, a cyclic polyorganosiloxane, a network polyorganosiloxane, and a partially branched linear polyorganosiloxane. In particular, a linear polyorganosiloxane is preferred. Specifically, a polyorganosiloxane having a molecular structure in which an alkoxy group is bonded to a silicone main chain through a methylene chain is preferred.

As such component (E), there may be suitably used, for example, commercially available products SH1107, SR2402, BY16-160, BY16-161, BY16-160E, and BY16-161E manufactured by Dow Corning Toray Co., Ltd.

The content of the polyorganosiloxane (E) is preferably 0.05 to 0.30 parts by mass, more preferably 0.05 to 0.20 parts by mass, still more preferably 0.07 to 0.15 parts by mass with respect to 100 parts by mass of the resin mixture (A). When the content is 0.05 part by mass or more, the deterioration of the polycarbonate resin hardly occurs and hence a reduction in molecular weight of the resin can be suppressed. In addition, when the content is 0.30 part by mass or less, balanced economic efficiency is achieved. In addition, silver does not occur on the surface of a molded article and hence the external appearance of the molded article becomes good.

[Other Additives]

The polycarbonate-based resin composition of the present invention can be blended with various known additives conventionally added to a polycarbonate-based resin composition as required in such a range that the effect of the present invention is not impaired in addition to the above-mentioned components (A) to (E). Examples of those additives include an antioxidant, a reinforcing material, a filler, a stabilizer, a UV absorber, an antistatic agent, a lubricant, a release agent, a dye, a pigment, and any other flame retardant or any other elastomer for an impact resistance improvement.

The content of those other additives is 0 to 1 parts by mass, preferably 0.01 to 0.5 parts by mass with respect to 100 parts by mass of the resin mixture (A) in ordinary cases.

In particular, when the antioxidant is used, for example, a phosphorus antioxidant and/or a phenol antioxidant are each/is suitably used. Further, among the antioxidants, a phosphite antioxidant such as tris(2,4-di-t-butylphenyl) phosphite is preferred in terms of improvements in: heat stability of the composition at the time of its high-temperature molding; and long-term heat stability of the molded article.

One of those antioxidants may be used alone, or two or more thereof may be used in combination. The blending amount of the antioxidant is about 0.01 to 1 parts by mass, preferably 0.1 to 0.3 part by mass, more preferably 0.05 to 0.3 part by mass with respect to 100 parts by mass of the resin mixture as the component (A).

When the blending amount falls within the range, the heat stability of the composition in, for example, a molding step and the long-term heat stability of the molded article can be maintained, and a reduction in molecular weight of the composition hardly occurs. In addition, when the blending amount exceeds 1 part by mass, the following tendency is observed: an adverse effect of a decomposition product of the antioxidant produced by heat, moisture, or the like on the polycarbonate enlarges.

[Molded Article]

A molded article formed of the polycarbonate-based resin composition of the present invention is obtained by molding a product obtained by blending and kneading the foregoing respective components.

Upon production of the polycarbonate-based resin composition of the present invention, the blending ratios of the respective components need to be adjusted so that the viscosity-average molecular weight of the polycarbonate-based resin composition to be obtained may be 17,000 to 23,000, preferably 18,000 to 22,000. In particular, the blending ratios of the polycarbonate-polyorganosiloxane copolymer as the component (A-1) and the aromatic polycarbonate except the component (A-1) as the component (A-2) need to be adjusted in consideration of their viscosity-average molecular weights. Setting the viscosity-average molecular weight of the polycarbonate-based resin composition within the range enables the polycarbonate-based resin composition to secure flowability at the time of its melting and to be excellent in moldability.

A method for the kneading is not particularly limited and examples thereof include methods involving using a ribbon blender, a Henschel mixer, a Banbury mixer, a drum tumbler, a single-screw extruder, a twin-screw extruder, a co-kneader, and a multi-screw extruder. A heating temperature during the kneading is selected from the range of generally 240 to 330° C., preferably 250 to 320° C.

Various conventionally known molding methods such as an injection molding method, an injection compression molding method, an extrusion molding method, a blow molding method, a press molding method, a vacuum molding method, and an expansion molding method can be employed for the molding.

It should be noted that a component to be incorporated except the polycarbonate resin can be melted and kneaded with the polycarbonate resin or any other thermoplastic resin in advance, i.e., can be added as a master batch.

In addition, the kneaded product is preferably pelletized and injection-molded. A general injection molding method or injection compression molding method, and a special molding method such as a gas-assisted molding method can be employed, and hence various molded articles can be produced.

In addition, when the molded article of the invention of the present application is used as an external appearance member, a molding technology for improving an external appearance such as a heat cycle molding method, a high-temperature mold, or an insulated runner mold is preferably employed.

In addition, when a part is required to be made flame-retardant, a molding technology such as laminate molding or two-color molding with a resin material having flame retardancy is preferably employed.

Insert molding or outsert molding becomes an effective method when a molding machine has a high-temperature heat source because performing the insert molding or outsert molding of a metal part can improve the efficiency of heat transfer from the heat source.

In order that a large, thin injection-molded article may be obtained, injection compression molding, or high-pressure or ultrahigh-pressure injection molding is preferably employed, and partial compression molding or the like can be employed in the molding of a molded article having a partial thin portion.

The polycarbonate-based resin composition of the present invention can be used as a constituent member for a current breaker to be used in an automobile or the like because the composition can be molded into a molded article that is excellent in impact resistance at low temperature and has excellent impact resistance even after high-temperature aging.

EXAMPLES

Hereinafter, the present invention is described more specifically by way of Examples and Comparative Examples, but is in no way limited thereto.

First, a polycarbonate-polyorganosiloxane copolymer as the component (A-1) was produced as described below.

Production Example 1

Production of Polycarbonate-Polydimethylsiloxane Copolymer (Si-PC-1)

(1) Synthesis of Polycarbonate Oligomer

Sodium dithionite was added in an amount of 2,000 ppm by mass with respect to bisphenol A (BPA) to be dissolved later to a 5.6-mass % aqueous sodium hydroxide, and then bisphenol A was dissolved in the mixture so that the concentration of bisphenol A was 13.5 mass %. Thus, a solution of bisphenol A in aqueous sodium hydroxide was prepared.

The solution of bisphenol A in aqueous sodium hydroxide, methylene chloride, and phosgene were continuously passed through a tubular reactor having an inner diameter of 6 mm and a tube length of 30 m at flow rates of 40 L/hr, 15 L/hr, and 4.0 kg/hr, respectively. The tubular reactor had a jacket portion and the temperature of the reaction liquid was kept at 40° C. or less by passing cooling water through the jacket.

The reaction liquid that had exited the tubular reactor was continuously introduced into a baffled vessel type reactor provided with a sweptback blade and having an internal volume of 40 L. The solution of bisphenol A in aqueous sodium hydroxide, a 25-mass % aqueous sodium hydroxide, water, and a 1-mass % aqueous solution of triethylamine were further added to the reactor at flow rates of 2.8 L/hr, 0.07 L/hr, 17 L/hr, and 0.64 L/hr, respectively, to perform a reaction. An aqueous phase was separated and removed by continuously extracting the reaction liquid overflowing the vessel type reactor and leaving the reaction liquid at rest. Then, a methylene chloride phase was collected.

The polycarbonate oligomer thus obtained had a concentration of 329 g/L and a chloroformate group concentration of 0.74 mol/L.

(2) Production of Polycarbonate-Polydimethylsiloxane Copolymer (Si-PC-1)

15 L of the polycarbonate oligomer solution produced in the foregoing, 9.0 L of methylene chloride, 393 g of a 2-allylphenol-terminal-modified polydimethylsiloxane (PDMS) having a number of repetitions of a dimethylsiloxy unit of 90, and 8.8 mL of triethylamine were loaded into a 50-L vessel type reactor provided with a baffle board, a paddle type stirring blade, and a cooling jacket. 1,389 g of a 6.4-mass % aqueous sodium hydroxide were added to the mixture under stirring to perform a reaction between the polycarbonate oligomer and the allylphenol-terminal-modified PDMS for 10 minutes.

A solution of p-t-butylphenol (PTBP) in methylene chloride (prepared by dissolving 138 g of PTBP in 2.0 L of methylene chloride) and a solution of BPA in aqueous sodium hydroxide (prepared by dissolving 1,012 g of BPA in an aqueous solution prepared by dissolving 577 g of NaOH and 2.0 g of sodium dithionite in 8.4 L of water) were added to the polymerization liquid to perform a polymerization reaction for 50 minutes.

10 L of methylene chloride were added to the resultant for dilution and then the mixture was stirred for 10 minutes. After that, the mixture was separated into an organic phase containing a polycarbonate-polydimethylsiloxane copolymer, and an aqueous phase containing excess amounts of BPA and NaOH, and then the organic phase was isolated.

The solution of the polycarbonate-polydimethylsiloxane copolymer in methylene chloride thus obtained was sequentially washed with a 0.03-mol/L aqueous NaOH and a 0.2-mol/L hydrochloric acid in amounts of 15 vol % each with respect to the solution. Next, the solution was repeatedly washed with pure water until an electric conductivity in an aqueous phase after the washing became 0.01 µS/m or less.

The solution of the polycarbonate-polydimethylsiloxane copolymer in methylene chloride obtained by the washing was concentrated and pulverized, and then the resultant flake was dried under reduced pressure at 120° C.

The resultant polycarbonate-polydimethylsiloxane copolymer had a PDMS residue amount (PDMS copolymerization amount) determined by nuclear magnetic resonance (NMR) of 6.0 mass %, a viscosity number measured in conformity with ISO 1628-4 (1999) of 47.5, and a viscosity-average molecular weight Mv of 17,700.

Production Examples 2 and 3

Production of Polycarbonate-Polydimethylsiloxane Copolymers (Si-PC-2) and (Si-PC-3)

(Si-PC-2) and (Si-PC-3) were synthesized in the same manner as in Production Example 1 except for changing the kind of the polydimethylsiloxane (change in average number of repetitions n of the siloxane group in the constituent unit represented by the formula (II)), the usage of the polydimethylsiloxane, and the usage of p-t-butylphenol as shown in Table 1.

Table 1 shows the composition, viscosity number, and viscosity-average molecular weight Mv of each of the resultant polycarbonate-polydimethylsiloxane copolymers.

TABLE 1

|  | Unit | Production Example 1 Si-PC-1 | Production Example 2 Si-PC-2 | Production Example 3 Si-PC-3 |
|---|---|---|---|---|
| Average number of repetitions n of siloxane group in formula (II) | — | 90 | 150 | 40 |
| Usage of allylphenol terminal-modified polydimethylsiloxane | g | 393 | 393 | 393 |
| Usage of p-t-butylphenol | g | 138 | 138 | 138 |
| Amount of allylphenol terminal-modified polydimethylsiloxane residue | Mass % | 6 | 6 | 6 |
| Viscosity number | mL/g | 47.5 | 47.5 | 47.5 |
| Viscosity-average molecular weight | — | 17,700 | 17,700 | 17,700 |

Examples 1 to 6 and Comparative Examples 1 to 6

Polycarbonate-based resin compositions were each prepared by blending the respective components at ratios shown in Table 2. In the preparation, 0.10 part by mass of tris(2,4-di-tert-butylphenyl)phosphite (manufactured by BASF, trade name: "Irgafos 168") as an antioxidant was mixed with respect to 100 parts by mass of the component (A), and then the contents were melted and kneaded with a vented biaxial extruder (manufactured by TOSHIBA MACHINE CO., LTD., model name: "TEM-35B") at a resin temperature of 280° C. to provide a pellet of each polycarbonate-based resin composition.

The polycarbonate-based resin composition pellet was injection-molded with an injection molding machine under the molding conditions of a cylinder temperature of 280° C. and a mold temperature of 80° C. to provide a test piece.

The resultant test piece was measured for its impact strengths at 23° C. and −40° C., combustibility, and modulus of elasticity by methods described below. Table 2 shows the results.

The components shown in Table 2, which were used in the preparation of the polycarbonate-based resin compositions, are as follows.

(A-1) Polycarbonate-Polyorganosiloxane Copolymer

Polycarbonate-polydimethylsiloxane copolymers (Si-PC-1 to 3) produced in Production Examples 1 to 3

(A-2) Aromatic Polycarbonate Resin Except (A-1)

1) Tarflon FN2200A (trade name, manufactured by Idemitsu Kosan Co., Ltd., BPA polycarbonate having p-t-butylphenol as a terminal group, viscosity-average molecular weight Mv=21,500)

2) Tarflon FN2600A (trade name, manufactured by Idemitsu Kosan Co., Ltd., BPA polycarbonate having p-t-butylphenol as a terminal group, viscosity-average molecular weight Mv=25,500)

3) NOVAREX 7030PJ (trade name, manufactured by Mitsubishi Engineering-Plastics Corporation, BPA polycarbonate having p-t-butylphenol as a terminal group, viscosity-average molecular weight Mv=29,000)

(B) Polyorganosiloxane-Acrylic Composite Rubber

B-1) METABLEN SX-005 (trade name, manufactured by Mitsubishi Rayon Co., Ltd., polyorganosiloxane-acrylic composite rubber whose core is formed of polyorganosiloxane and n-butyl acrylate and whose shell is formed of methyl methacrylate)

B-2) METABLEN SRK-200 (trade name, manufactured by Mitsubishi Rayon Co., Ltd., polyorganosiloxane-acrylic composite rubber whose core is formed of polyorganosiloxane and n-butyl acrylate and whose shell is formed of styrene and acrylonitrile)

(C) EFTOP KFBS (Trade Name, Mitsubishi Materials Electronic Chemicals Co., Ltd., Potassium Perfluorobutanesulfonate)

(D) METABLEN A-3800 (Trade Name, Manufactured by Mitsubishi Rayon Co., Ltd., Mixed Powder Formed of Polytetrafluoroethylene Particles and Organic Polymer Particles)

(E) BY16-161 (Trade Name, Manufactured by Dow Corning Toray Co., Ltd., Polysiloxane Containing a Methoxysilyl Group in which a Methoxy Group is Bonded to a Silicon Atom Through a Divalent Hydrocarbon Group)

In addition, with regard to physical property evaluations in the present invention, a resin was evaluated for its respective characteristics with a granulated pellet obtained in each of Examples and Comparative Examples by the following methods.

(Physical Property Evaluation)

(1) Viscosity-Average Molecular Weight (Mv)

The limiting viscosity $[\eta]$ of a methylene chloride solution at 20° C. was measured and the viscosity-average molecular weight was calculated from Schnell's equation ($[\eta]=1.23\times10^{-5}\times Mv^{0.83}$).

(2) Measurement of Flowability (Q Value)

The resultant pellet was dried at 120° C. for 5 hours and then its Q value (flow value) [unit; $10^{-2}$ mL/sec] was measured.

The amount (mL/sec) of a molten resin flowing out of a nozzle having a diameter of 1 mm and a length of 10 mm was measured with an elevated flow tester in conformity with JIS K 7210 at 280° C. under a pressure of 15.7 MPa.

The Q value represents the amount of the resin that flows out per unit time and a higher Q value means that its flowability is higher.

(3) Moldability

Moldability was evaluated in accordance with the following criteria in consideration of the Q value representing flowability.
A (good): The Q value is 5 or more.
X (bad): The Q value is less than 5.

(4) Izod impact test (without aging)

Notched Izod impact tests were performed in conformity with ASTM D256 at 23° C. and −40° C.

(5) Izod impact test (with aging)

Each pellet was aged with a hot air circulating oven at 105° C. for 400 hours, and was then left to stand at 23° C. for 4 hours. After that, notched Izod impact tests were performed in conformity with ASTM D256 at 23° C. and −40° C.

A pellet having an Izod impact value of 400 J/m or more at each of 23° C. and −40° C. irrespective of the presence or absence of the aging is good.

(6) Combustibility

A vertical flame test was performed with a test piece (having a length of 12.7 mm, a width of 12.7 mm, and a thickness of 1.5 mm) produced in conformity with the UL standard 94, and an evaluation was performed by classifying the results of the test into V-0, V-1, and V-2.

(7) Bending Modulus

A bending test was performed in conformity with ASTM D790.

TABLE 2

| | Composition | | Unit | Example 1 | Example 2 | Example 3 | Example 4 | Example 5 | Example 6 |
|---|---|---|---|---|---|---|---|---|---|
| Polycarbonate-based resin | Polycarbonate-polyorganosiloxane copolymer (A-1) | Si-PC-1 | Mass % | 100 | 80 | 80 | 60 | — | 80 |
| | | Si-PC-2 | | — | — | — | — | 80 | — |
| | | Si-PC-3 | | — | — | — | — | — | — |
| | Aromatic polycarbonate (A-2) | 7030PJ | Mass % | — | — | — | — | — | — |
| | | FN2600A | | — | — | — | 40 | — | — |
| | | FN2200A | | — | 20 | 20 | — | 20 | 20 |
| | Polyorganosiloxane block | Content | Mass % | 6.0 | 4.8 | 4.8 | 3.6 | 4.8 | 4.8 |
| | | Number of siloxane groups | n | 90 | 90 | 90 | 90 | 150 | 90 |
| (A) | Total | | Part(s) by mass | 100 | 100 | 100 | 100 | 100 | 100 |
| (B) | Composite rubber-1 (B-1) | SX-005 | Part(s) by mass | 3 | 3 | — | 3 | 3 | 3 |
| | Composite rubber-2 (B-2) | SRK-200 | | — | — | 3 | — | — | — |
| (C) | Metal salt | KFBS | | — | — | — | — | — | 0.03 |
| (D) | PTFE-based anti-dripping agent | A-3800 | | — | — | — | — | — | 0.3 |
| (E) | Polyorganosiloxane | BY16-161 | | — | — | — | — | — | 0.1 |
| Physical property of composition | Viscosity-average molecular weight | | Mv | 17700 | 18800 | 18800 | 20800 | 18800 | 18800 |
| | Flowability | | Q value $10^{-2}$ mL·sec$^{-1}$ | 14 | 10 | 10 | 7 | 10 | 10 |
| | Moldability | | — | A | A | A | A | A | A |
| | Izod impact test without aging | | 23° C. J/m | 740 | 760 | 760 | 800 | 710 | 720 |
| | | | −40° C. | 580 | 600 | 570 | 650 | 630 | 570 |
| | Izod impact test with aging | | 23° C. | 680 | 700 | 700 | 750 | 650 | 680 |
| | | | −40° C. | 520 | 540 | 510 | 590 | 560 | 520 |
| | Combustibility (UL94) | | 1.5 mmt — | V-2 | V-2 | V-2 | V-2 | V-2 | V-0 |
| | Bending modulus | | MPa | 2010 | 2010 | 2010 | 2010 | 2010 | 2010 |

| | Composition | | Unit | Comparative Example 1 | Comparative Example 2 | Comparative Example 3 | Comparative Example 4 | Comparative Example 5 | Comparative Example 6 |
|---|---|---|---|---|---|---|---|---|---|
| Polycarbonate-based resin | Polycarbonate-polyorganosiloxane copolymer (A-1) | Si-PC-1 | Mass % | 80 | 50 | — | — | — | 80 |
| | | Si-PC-2 | | — | — | — | — | — | — |
| | | Si-PC-3 | | — | — | 100 | — | — | — |
| | Aromatic polycarbonate (A-2) | 7030PJ | Mass % | — | 50 | — | — | — | — |
| | | FN2600A | | — | — | — | 100 | 100 | — |
| | | FN2200A | | 20 | — | — | — | — | 20 |
| | Polyorganosiloxane block | Content | Mass % | 4.8 | 3.0 | 6.0 | 0.0 | 0.0 | 4.8 |
| | | Number of siloxane groups | n | 90 | 90 | 40 | — | — | 90 |
| (A) | Total | | Part(s) by mass | 100 | 100 | 100 | 100 | 100 | 100 |

TABLE 2-continued

| | | | | | | | | | |
|---|---|---|---|---|---|---|---|---|---|
| (B) | Composite rubber-1 (B-1) | SX-005 | Part(s) by mass | — | 3 | 3 | — | 3 | 6 |
| | Composite rubber-2 (B-2) | SRK-200 | | — | — | — | — | — | — |
| (C) | Metal salt | KFBS | | — | — | — | — | — | — |
| (D) | PTFE-based anti-dripping agent | A-3800 | | — | — | — | — | — | — |
| (E) | Polyorgano-siloxane | BY16-161 | | — | — | — | — | — | — |
| Physical property of composition | Viscosity-average molecular weight | Mv | | 18800 | 23300 | 17700 | 21500 | 21500 | 18800 |
| | Flowability | Q value | $10^{-2}$ mLsec$^{-1}$ | 7 | 4 | 14 | 5 | 5 | 10 |
| | Moldability | — | — | A | X | A | A | A | A |
| | Izod impact test without aging | 23° C. | J/m | 800 | 900 | 730 | 800 | 810 | 800 |
| | | −40° C. | | 640 | 850 | 360 | 180 | 310 | 640 |
| | Izod impact test with aging | 23° C. | | 600 | 850 | 670 | — | 800 | 740 |
| | | −40° C. | | 220 | 720 | 260 | — | 220 | 570 |
| | Combustibility (UL94) | 1.5 mmt | — | V-2 | V-2 | V-2 | V-2 | V-2 | V-2 |
| | Bending modulus | | MPa | 2110 | 2130 | 2010 | 2300 | 2200 | 1890 |

As can be seen from Table 2, each of the polycarbonate-based resin compositions of Examples 1 to 6 each containing a polycarbonate-polyorganosiloxane copolymer having a specific number of repetitions of an organosiloxane constituent unit and a polyorganosiloxane-acrylic composite rubber is excellent in low-temperature impact resistance and is excellent in impact resistance after high-temperature aging. In contrast, Comparative Example 1 free of any polyorganosiloxane-acrylic composite rubber is poor in impact resistance after high-temperature aging, and Comparative Example 2 in which the viscosity-average molecular weight of the resin mixture exceeds 23000 shows a small Q value and is hence poor in moldability. It is also found that both the low-temperature impact resistance and the impact resistance after high-temperature aging reduce in each of: Comparative Example 3 in which the number of repetitions of the organosiloxane constituent unit in the polycarbonate-polyorganosiloxane copolymer is small; and Comparative Examples 4 and 5 each using an aromatic polycarbonate without using any polycarbonate-polyorganosiloxane copolymer. Further, as can be seen from Comparative Example 6, when the blending amount of the polyorganosiloxane-acrylic composite rubber to be blended as the component (B) is large, the low-temperature impact resistance and the impact resistance after high-temperature aging are satisfied, but the bending modulus reduces, and hence a polycarbonate-based resin composition that satisfies all characteristics cannot be obtained.

INDUSTRIAL APPLICABILITY

The polycarbonate-based resin composition of the present invention is excellent in impact resistance under low temperature and has an excellent low-temperature impact strength even after high-temperature aging. The molded article of the polycarbonate-based resin composition of the present invention is useful in, for example, a current breaker structural member for an automobile.

The invention claimed is:

1. A polycarbonate-based resin composition, comprising, with respect to 100 parts by mass of (A) a resin mixture formed of 30 to 100 mass % of a polycarbonate-polyorganosiloxane copolymer (A-1) having a structural unit represented by the general formula (I) and a structural unit represented by the general formula (II), and having an average number of repetitions n of an organosiloxane constituent unit in the general formula (II) of 50 to 500, and 0 to 70 mass % of an aromatic polycarbonate (A-2) except the copolymer (A-1), 1.5 to 4.5 parts by mass of (B) a polyorganosiloxane-acrylic composite rubber, the composition having a viscosity-average molecular weight of from 17000 to 23000:

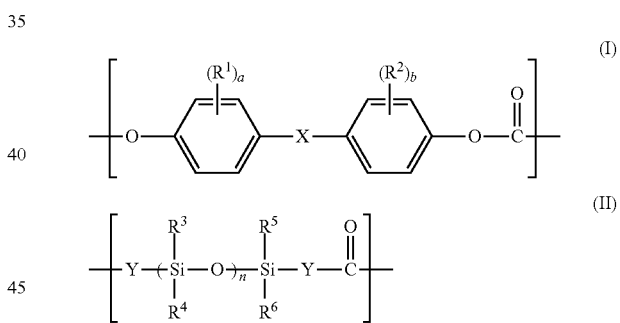

wherein $R^1$ and $R^2$ each independently represent an alkyl group or alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, a and b each independently represent an integer of 0 to 4, $R^3$ to $R^6$ each independently represent a hydrogen atom, a halogen atom, an alkyl group having 1 to 6 carbon atoms, an alkoxy group having 1 to 6 carbon atoms, or an aryl group having 6 to 12 carbon atoms, Y represents an organic residue containing an aliphatic or aromatic moiety, and n represents an average number of repetitions.

2. The polycarbonate-based resin composition according to claim 1, wherein Y represents an organic residue derived from allylphenol or eugenol.

3. The polycarbonate-based resin composition according to claim 1, wherein the structural unit represented by the general formula (I) comprises a structural unit derived from bisphenol A.

4. The polycarbonate-based resin composition according to claim 1, wherein all of $R^3$ to $R^6$ in the structural unit represented by the general formula (II) represent methyl groups.

5. The polycarbonate-based resin composition according to claim 1, wherein the polyorganosiloxane-acrylic composite rubber (B) comprises a composite rubber whose core is formed of a polyorganosiloxane and a polyalkyl (meth) acrylate, and whose shell is obtained by graft polymerization of one or more vinyl monomers.

6. The polycarbonate-based resin composition according to claim 1, further comprising 0.01 to 0.10 parts by mass of (C) an alkali metal salt and/or alkali earth metal salt of an organic sulfonic acid, and/or 0.1 to 1 parts by mass of (D) a polytetrafluoroethylene-based anti-dripping agent having a fibril-forming ability.

7. The polycarbonate-based resin composition according to claim 6, wherein the polytetrafluoroethylene-based anti-dripping agent (D) having a fibril-forming ability comprises mixed powder formed of polytetrafluoroethylene particles and organic polymer particles.

8. The polycarbonate-based resin composition according to claim 1, further comprising, with respect to 100 parts by mass of the component (A), 0.05 to 0.30 parts by mass of (E) a polyorganosiloxane.

9. A molded article, which is obtained by molding the polycarbonate-based resin composition according to claim 1.

10. A current breaker structural member, comprising the molded article according to claim 9.

* * * * *